Figure 1:
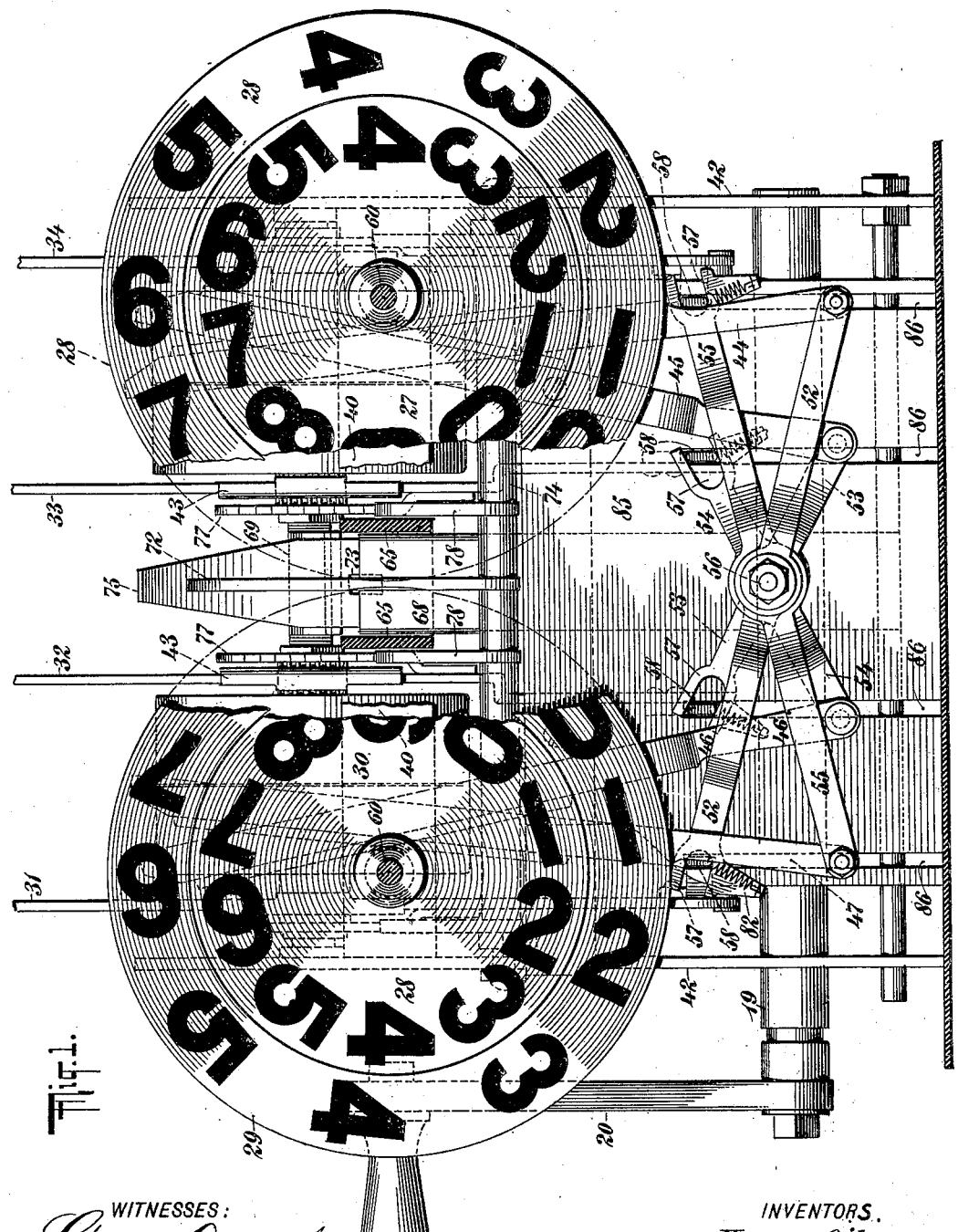

No. 677,864. Patented July 9, 1901.
H. GILES & J. G. FLEMING.
CASH REGISTER.
(Application filed Sept. 18, 1900.)
(No Model.) 5 Sheets—Sheet 1.

WITNESSES:
Gustave Dieterich
John Kehlenbeck

INVENTORS.
Harvey Giles
John G. Fleming
BY Chas. C. Gill
ATTORNEY

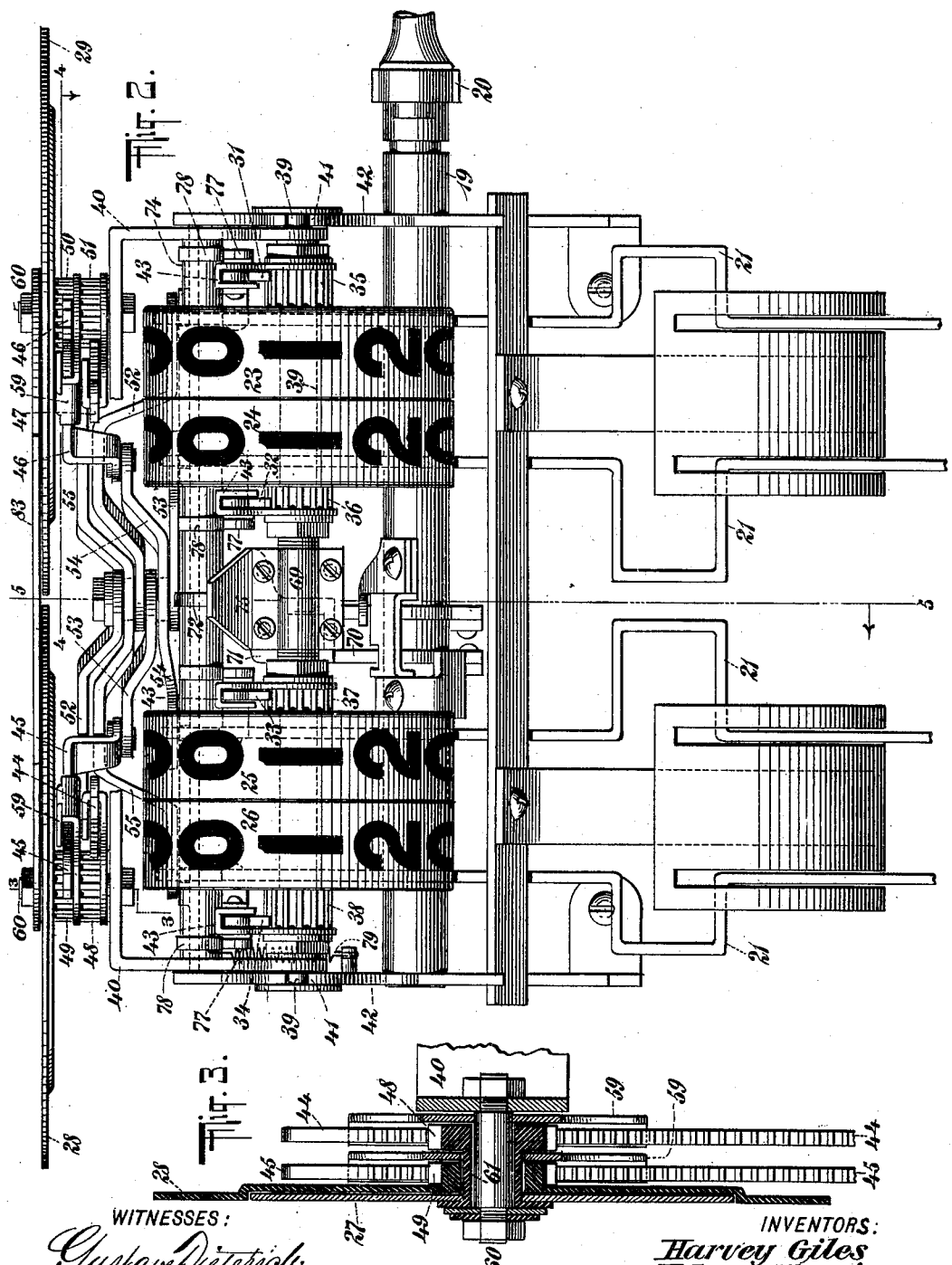

No. 677,864. Patented July 9, 1901.
H. GILES & J. G. FLEMING.
CASH REGISTER.
(Application filed Sept. 18, 1900.)
(No Model.) 5 Sheets—Sheet 3.
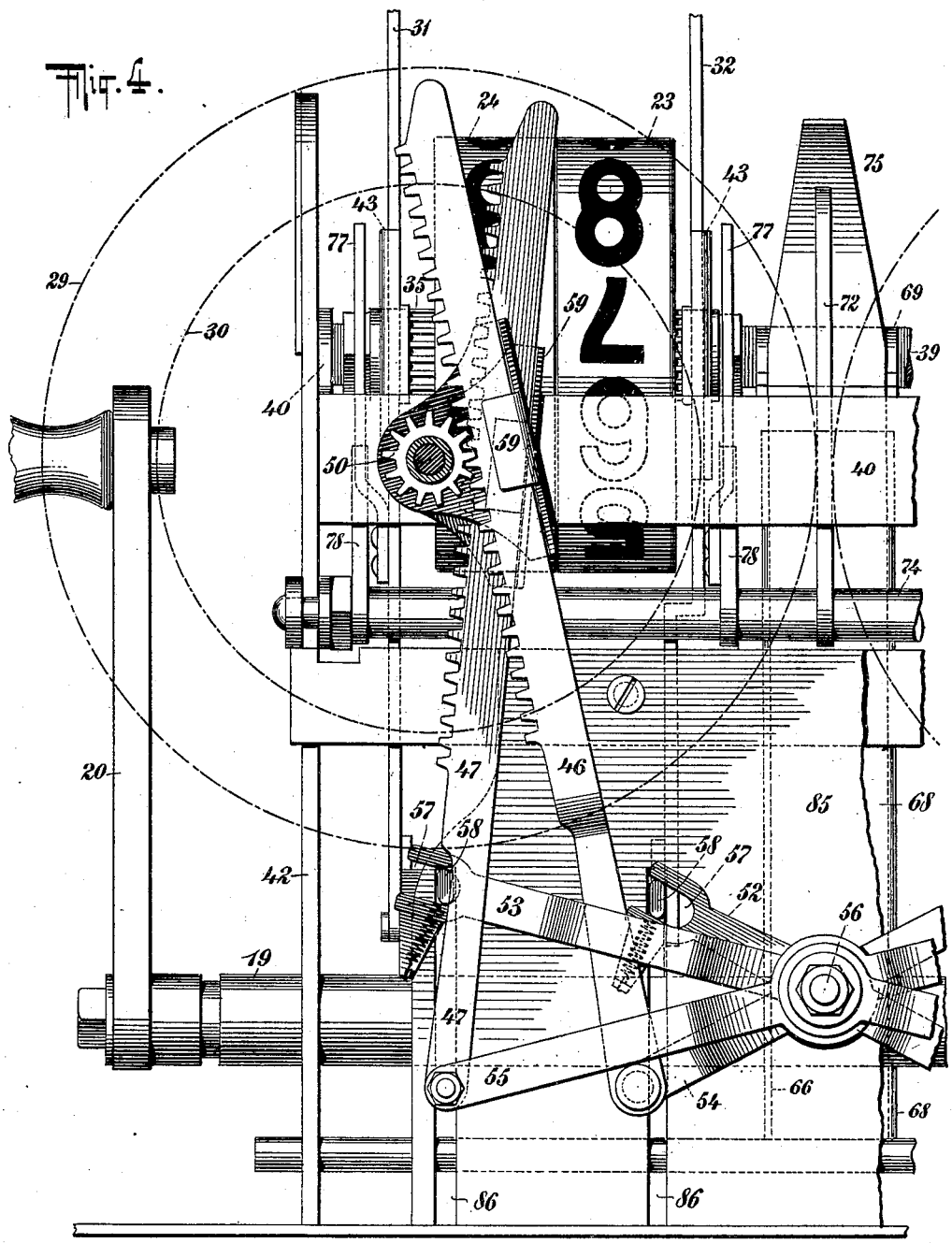
WITNESSES: INVENTORS.
Harvey Giles
John G. Fleming
BY
ATTORNEY

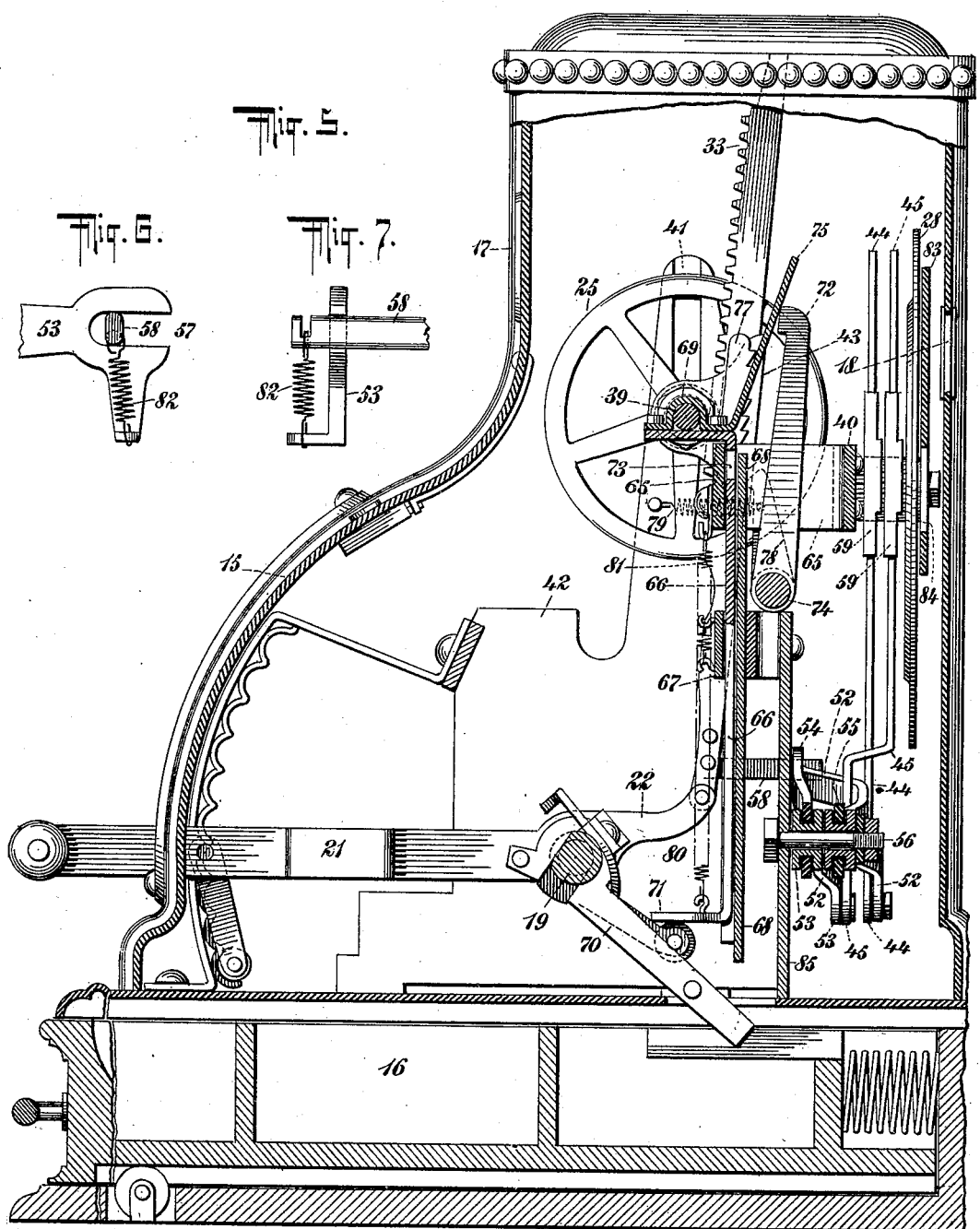

No. 677,864. Patented July 9, 1901.
H. GILES & J. G. FLEMING.
CASH REGISTER.
(Application filed Sept. 18, 1900.)
(No Model.) 5 Sheets—Sheet 5.
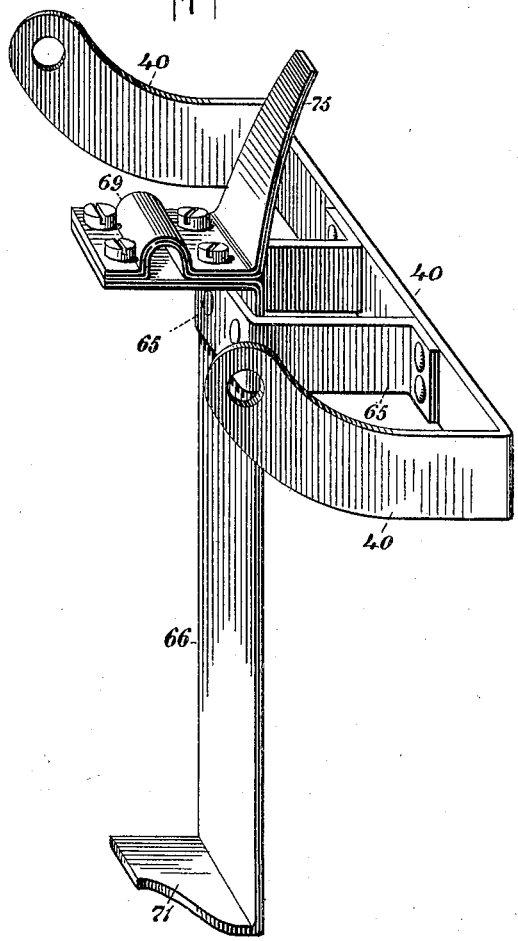
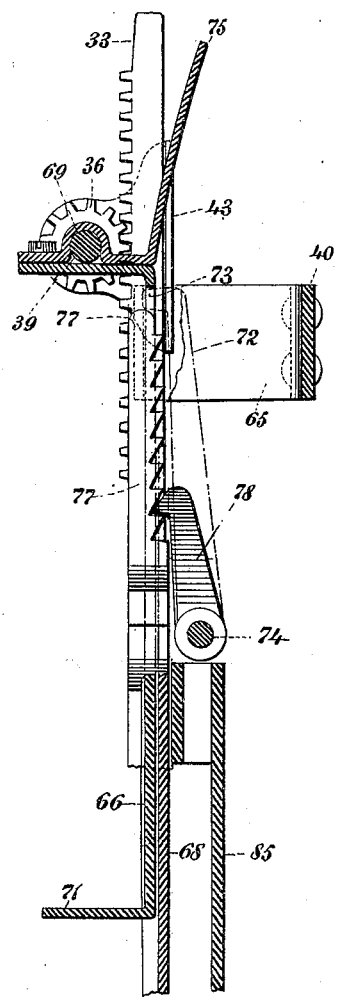
WITNESSES:
INVENTORS
Harvey Giles
John G. Fleming
BY
ATTORNEY

UNITED STATES PATENT OFFICE.

HARVEY GILES, OF SOUTH BOUNDBROOK, AND JOHN G. FLEMING, OF NEW BOUNDBROOK, NEW JERSEY, ASSIGNORS TO THE IDEAL CASH REGISTER COMPANY, OF NEW BOUNDBROOK, NEW JERSEY.

CASH-REGISTER.

SPECIFICATION forming part of Letters Patent No. 677,864, dated July 9, 1901.

Application filed September 18, 1900. Serial No. 30,408. (No model.)

*To all whom it may concern:*

Be it known that we, HARVEY GILES, a resident of South Boundbrook, and JOHN G. FLEMING, a resident of New Boundbrook, Somerset county, New Jersey, citizens of the United States, have invented certain new and useful Improvements in Cash-Registers, of which the following is a specification.

The invention relates to improvements in cash-registers, and pertains more particularly to means, as hereinafter described, for indicating the amount of a sale. In accordance with a part of our invention we provide means for indicating the amount of the sale, both at the front and the back of the register-casing, so that should the register be in a position between the customer and the salesman both the customer and the salesman may observe the indication. In the embodiment of our invention presented in this application we provide two sets of indicators, one set being in the form of rotary cylinders or drums and the other set being in the form of rotary disks, the said drums and disks being capable of simultaneous motion and the drums being arranged to expose the indication at the front of the cash-register, while the disks are arranged to expose the indication at the rear side of the register. The register-casing is provided with window-openings at its front and rear sides, through which the indication may be observed when the indicating cylinders or drums and the indicating-disks are in line with said window-openings. In the arrangement of mechanism presented in this application the indicating cylinders or drums and indicating-disks are capable of being moved vertically, and this part of the mechanism is provided in order that after one indication has been exposed and a subsequent sale is to be made the said cylinders or drums and the said disks may upon the movement of any one of the hand setting-levers be permitted to descend to a position below the window-openings in the register-casing, so that the said indicating cylinders or drums and the said disks shall be turned by the operation of the hand setting-levers, when said cylinder or drums and said disks are substantially concealed from both the customer and the salesman. After the indicating cylinders or drums and indicating-disks have been rotated to the proper degree by the movement of the hand setting-levers the said cylinders or drums and said disks are through the medium of an exposed operating crank-handle, which effects the proper registration, elevated to a position in line with the window-openings, thereby to expose the indication. After the indicating cylinders or drums and indicating-disks have been moved through the action of the said exposed crank-handle to their upper position they will there remain, exposing the indication until another sale has been effected and the hand setting-levers are again moved as a preliminary step to the registration and indication of such subsequent sale.

The invention is not in every instance limited to the provision of means for vertically moving the indicating cylinders or drums and indicating-disks, since our invention possesses novelty apart from the means for effecting the raising and lowering of said indicating cylinders or drums and said disks.

The invention consists in the novel features, combinations, and arrangement of parts hereinafter described, and pointed out in the claims.

The invention and satisfactory means for carrying the same into effect will be fully understood from the detailed description hereinafter presented, reference being had to the accompanying drawings, in which—

Figure 1 is a rear elevation, partly broken away, of the interior mechanism of a cash-register constructed in accordance with and embodying the invention, the register-casing being omitted. Fig. 2 is a top view of same, the register-casing being omitted. Fig. 3 is an enlarged vertical longitudinal section through a pair of the indicating-disks and connected devices on the dotted line 3 3 of Fig. 2. Fig. 4 is a vertical transverse section through a portion of the register on the dotted line 4 4 of Fig. 2 looking at the register mechanism from the rear and being partly broken away, the indicating-disks being denoted by dotted lines to illustrate their relation to the front indicating cylinders or drums. Fig. 5 is a central vertical longitudinal section through the register embracing our invention on the dotted line 5 5 of Fig. 2, the register-casing being in this figure illustrated. Figs. 6 and 7 are detached views of one of the details of the register mechanism and will be hereinafter referred to. Fig. 8 is an enlarged detached perspective view of the framing for supporting and moving vertically with the indicating cylinders or drums and indicating-disks; and Fig. 9 is a vertical section, partly broken away, through a portion of the register and is presented to show the relation of the pawls 78 to the toothed bars 77 when the indicating cylinders or drums and indicating-disks are in their upper or exposure position.

We have omitted from the accompanying drawings all those portions of the register which pertain to the registering and totalizing wheels and the means for operating the same, since such devices are not made the subject of this application, nor is this application limited to any special means for registering and adding the amounts of the sales; but such portions of the register which have been omitted from the accompanying drawings, as above mentioned, may be readily understood by reference to the Letters Patent of the United States No. 640,825, granted to Ideal Cash Register Company on January 9, 1900, as assignee of Elijah F. Spaulding. The present invention is confined solely to the indicating mechanism, and therefore it will be unnecessary to specifically describe any parts of the register not in operative relation to or connected with the indicating means.

In the drawings, 15 designates the register-casing, which casing is usually mounted over a cash-drawer 16 and in the present instance contains at the front and rear sides of its upper portion the front and rear window-openings 17 18, through which the indication is to be exposed to the customer and salesman.

Within the register-casing 15 is mounted the operating or driving shaft 19, having on one end, exterior to said casing 15, the operating crank-handle 20, of known form and construction.

Upon the operating-shaft 19 is freely mounted the series of hand setting-levers 21, which correspond with one another and are given the various customary movements along the vertical slots in the front portion of the register-casing in accordance with the amount to be registered and indicated. The hand setting-levers 21, with the exception of the crank-arms 22 at their rear ends for connection with the indicating devices, are not novel in this application and are not claimed herein, and the movements of said levers 21 along the vertical slots in the front of the register-casing are operations well known in this art.

The indicator cylinders or drums, Fig. 2, are designated by the numerals 23, 24, 25, and 26, respectively, and in themselves are of known form and construction, each bearing the numerals from "0" to "9," inclusive, and respectively representing units of cents, tens of cents, units of dollars, and tens of dollars. The indicating cylinders or drums 23, 24, 25, and 26 expose at the proper time their indication through the front window 17 in the register-casing.

The operating-shaft 19, crank-handle 20, setting-levers 21, and indicating cylinders or drums 23, 24, 25, and 26 are shown and described in said Letters Patent No. 640,825.

The indicating rotary disks, which coöperate with the aforesaid indicating cylinders or drums, are designated, respectively, by the numerals 27, 28, 29, and 30, Fig. 1, and these disks are directly at the rear of the aforesaid indicating cylinders or drums and at the proper time expose their indication through the rear window 18 of the register-casing.

The indicating cylinders or drums 23 to 26, inclusive, and indicating-disks 27 to 30, inclusive, receive a simultaneous rotation from the hand setting-levers 21 through the medium of the intermediate mechanism hereinafter described. The first hand setting-lever 21 to the right represents units of cents, and when this lever is moved it will effect the simultaneous rotation of the units-of-cents indicating cylinder or drum 23 and the units-of-cents indicating-disk 27. When the next or tens-of-cents hand setting-lever 21 is moved, it will effect the simultaneous rotation of the tens-of-cents indicating cylinder or drum 24 and the tens-of-cents indicating-disk 28. When the units-of-dollars hand setting-lever 21 is moved, it will effect the simultaneous rotation of the units-of-dollars indicating cylinder or drum 25 and the units-of-dollars indicating-disk 29, and when the tens-of-dollars hand setting-lever 21 is moved it will effect the simultaneous rotation of the tens-of-dollars indicating cylinder or drum 26 and the tens-of-dollars indicating-disk 30. The units-of-cents and tens-of-cents indicating cylinders or drums 23 and 24 are at the right-hand side of the front portion of the register and the units-of-cents and tens-of-cents indicating-disks 27 and 28 are at the right-hand side of the rear portion of the register, and the units-of-dollars and tens-of-dollars indicating cylinders or drums 25 and 26 are at the left-hand side of the front portion of the register, while the indicating-disks 29 and 30 for units of dollars and tens of dollars are at the left-hand side of the rear portion of the register, and hence the numerals denoting the indication at both the front and rear sides of the register-casing read from left to right and always denote corresponding amounts. The indicating cylinders or drums and the indicating-disks receive their rotary motion to their predetermined positions, governed by the amounts of the sales from the hand setting-levers 21, while the vertical motion imparted to the said cylinders or drums and said disks to elevate the same to a position in line with the window-openings 17 and 18 is caused by pulling the exposed operating crank-handle 20 downward from the vertical position in which it is shown in Fig. 4 to a horizontal position in line with the base of the cash-register. The downward motion of the indicating cylinders or drums and indicating-disks is effected by gravity when the parts connected with said cylinders or drums and disks are released by the movement of any one of the hand-levers 21.

The hand setting-levers 21 are loosely mounted on the main driving-shaft 19, and hence the up-and-down movements of said levers 21 along their slots in the front of the register-casing do not affect said shaft 19, and likewise said shaft 19 may be rotated or turned by means of the exposed crank-handle 20 when the latter is moved from its vertical position (shown in Fig. 4) to a horizontal position and then back to its vertical or normal position without affecting the hand-levers 21.

The hand-levers 21 are each carried rearwardly beyond the main driving-shaft 19, as shown in Fig. 5, to form the crank-arms 22, hereinbefore referred to, and to the rear ends of the crank-arms 22 are pivotally secured the vertical rack-bars 31, 32, 33, and 34, respectively, which rack-bars are respectively in engagement with the pinion-wheels 35, 36, 37, and 38, Fig. 2, connected with the indicating cylinders or drums and with said indicating cylinders or drums mounted upon the shaft 39, carried by the vertically-movable frame 40 and guided at its ends in the vertical grooves 41, provided in the stationary main supporting side frames 42 for the register mechanism. The indicating cylinders or drums 23 to 26, inclusive, receive their rotary motion from the hand setting-levers 21 through the medium of the said racks 31 to 34, inclusive, and pinion-wheels 35 to 38, inclusive, each indicating cylinder or drum being independently rotatable. The racks 31 to 34, inclusive, are maintained in constant mesh with the pinion-wheels 35 to 38, inclusive, and are guided in their vertical movements by means of the saddles 43, which are formed from pieces of sheet metal and are loosely mounted on the shaft 39. The saddles 43 extend rearwardly from the shaft 39 and pass around the rear edges of the racks 31 to 34, inclusive. The saddles 43 serve to guide the rack-bars 31 to 34, inclusive, and to keep said bars in mesh with the pinion-wheels 35 to 38, inclusive, and said saddles are loosely hung on the shaft 39 in order that during the vertical movement of the rack-bars 31 to 34, inclusive, the said saddles may yield in a pivotal manner, so as to accommodate themselves to the line of travel of the said rack-bars.

The rack-bars 31 to 34, inclusive, effect the rotation of the indicating cylinders or drums 23 to 26, inclusive, but do not effect the rotation of the indicating-disks 27 to 30, inclusive, which disks are respectively rotated from the hand setting-levers 21 through the medium of the racks 44, 45, 46, and 47, which racks respectively engage the pinion-wheels 48, 49, 50, and 51, Fig. 2, connected with said disks, the rack 44 and pinion-wheel 48 being actuated from the units-of-cents hand setting-lever 21 and utilized to rotate the units-of-cents indicating-disk 27, the rack 45 and pinion-wheel 49 being actuated from the tens-of-cents hand setting-lever 21 and utilized to rotate the tens-of-cents indicating-disk 28, the rack 46 and gear-wheel 50 being actuated from the units-of-dollars hand setting-lever 21 and utilized to rotate the units-of-dollars indicating-disk 29, and the rack 47 and gear-wheel 51 being actuated from the tens-of-dollars hand setting-lever 21 and utilized to rotate the tens-of-dollars indicating-disk 30.

The racks 44 to 47, inclusive, for operating the indicating-disks 27 to 30, inclusive, are respectively connected at their lower ends with the levers 52, 53, 54, and 55, all of which levers are mounted upon the stud or shaft 56, and their ends opposite to the ends receiving the said rack-bars being bifurcated, as denoted at 57, and receiving the rearwardly-extending arms 58, connected with the lower ends of the rack-bars 31 to 34, inclusive, whereby the said levers 52, 53, 54, and 55 are rendered operable simultaneously with the rack-bars 44 to 47, inclusive, from the hand setting-levers 21. The units-of-cents hand setting-lever 21 imparts a vertical motion to the rack 31 for the units-of-cents cylinder or drum 23, and at the same time through the rearwardly-extending arm 58 turns the lever 52 on its pivotal support 56 and operates the rack-bar 44 to rotate the units-of-cents indicating-disk 27. The tens-of-cents setting-lever 21 moves the rack-bar 32 for the tens-of-cents indicating cylinder or drum 24, and at the same time through its rearwardly-extending arm 58 rocks the lever 53 to cause the rack-bar 45 to actuate the tens-of-cents indicating-disk 28. The units-of-dollars hand setting-lever 21 operates the rack-bar 33 to rotate the units-of-dollars indicating cylinder or drum 33, and at the same time through its rearwardly-extending arm 58 rocks the lever 54, so that the latter may move the rack-bar 46 to rotate the units-of-dollars indicating-disk 29, and the tens-of-dollars setting-lever 21 moves the rack-bar 34 to rotate the tens-of-dollars indicating cylinder or drum 26, and at the same time through its rearwardly-extending arm 58 rocks the lever 55 to move the rack-bar 47 for the purpose of rotating the tens-of-dollars indicating-disk 30. Thus when any one hand setting-lever 21 is moved it effects the proper rotation of its indicating cylinder or drum and its indicating cylinder or disk, and therefore it is plain that the indication may be exposed through the window-openings 17 and 18, respectively, at the front and rear sides of the register-casing. The rack-bars 44 to 47, inclusive, are maintained in mesh with the pinion-wheels 48 to 51, inclusive, by means of the saddles 59, which correspond with the saddles 43, hereinbefore referred to, and are pivotally swung from the shafts 60 for the aforesaid indicating-disks. The indicating-disks must be capable of independent rotation, and hence, taking one bar of the disks, numbered 27 and 28, for illustration and referring to Fig. 3 we connect the pinion-wheel 49 with the tens-of-cents indicating-disk 28 and mount this pinion-wheel 49 and disk 28 loosely upon the sleeve 61, connected with the pinion-wheel 48, to which the units-of-cents indicating-disk 27 is secured and which is rotated by means of the aforesaid rack-bar 44. The shafts or studs 60, upon which the pinion-wheels 48 and 49 and indicating-disks 27 and 28 are mounted, are carried by the frame 40 aforesaid, which is simply a bent bar and, as before described, carries the shaft 39 for the indicating cylinders or drums. The bar 40 is utilized to carry the shafts 60 for the indicating-disks and the shaft 39 for the indicating cylinders or drums simply for the reason that in the construction presented the said disks and the said drums have, in addition to their rotary motion, a vertical movement, and since the shafts 60 and 39 are both carried by the frame 40 it is evident that both the indicating cylinders or drums and the indicating-disks may have a simultaneous vertical movement imparted to them by the means hereinafter described. The indicating-disks 28 and 29 are sunk inward or concaved throughout their central portions to snugly receive the indicating-disks 27 and 30, this being for the purpose of causing the outer faces of said disks to present a plain flat surface, so that the indication thereon may be more readily and accurately read. Fig. 3 illustrates the disk 27 as received within the sunken or concaved portion of the disk 28.

In the foregoing description we have explained the means for operating both the indicating cylinders or drums and the indicating-disks from the hand setting-levers 21, and the arrangement of said indicating cylinders or drums and said disks and the means for operating the same from the hand setting-levers 21 constitute a part of our invention without regard to the vertical movement which may also be imparted to said indicating cylinders or drums and said disks. We will now describe the means for imparting the vertical movement to said indicating cylinders or drums and said indicating-disks, and the same constitute a part of our invention, although we do not limit the invention in every instance to the employment of such means for effecting such vertical movement to said indicating cylinders or drums and said indicating-disks.

The frame 40 at its central portion is connected by a stirrup or bent bar 65, Fig. 8, with the vertical bar 66, which is adapted to have a vertical motion in the guiding-loop 67 and against the stationary guiding-bar 68. The upper horizontal end of the bar 66 passes frontward below the shaft 39, as shown in Fig. 5, and has secured to it the sleeve 69, which passes around the upper side of the central portion of said shaft 39 and furnishes a bearing for said shaft 39. The sleeve 69, while connecting the bar 66 to the shaft, serves as a means for suspending the said bar 66 and also for suspending the stirrup or bent bar 65 and the frame 40, so that all of said bars thus suspended may have a simultaneous vertical motion.

It will be remembered that in the employment of the indicating devices the indicating cylinders or drums and the indicating-disks are given their rotary motion while said devices are at their lower position below the horizontal plane of the window-openings 17 and 18, and when said indicating devices have been sufficiently rotated by the movement of the hand setting-levers 21 the said devices are elevated to a position in line with the window-openings 17 and 18, so as to expose the indication. The means for thus elevating the indicating devices comprise the lever-arm 70, secured upon the operating-shaft 19 and adapted to engage, as shown in Fig. 5, a foot 71, formed on the lower end of the vertically-movable bar 66. When the lever-arm 70 and bar 66 are in their lower position, (shown in Fig. 5,) the crank-handle 20 will be in its vertical position. (Shown in Fig. 4.) When the crank-handle 20 is pulled downward to a horizontal position, it will rotate the shaft 19 and the latter will cause the lever-arm 70 to push upward against the foot 71 of the vertically-movable bar 66, and thereby through said bar 66, bent bar or stirrup 65, frame 40, and shaft 39 effect the elevation of the indicating cylinders or drums and indicating-disks. When the bar 66 and the indicating cylinders or drums and indicating-disks have thus been moved to their upper position, they will be there held by means of the dog 72, whose upper end will at such time enter the recess 73, formed in the upper end of the bar 66, the elevation of the bar 66 by the lever-arm 70 on the driving-shaft 19 carrying said recess 73 into alinement with the upper engaging end of said dog 72. The dog 72 is secured to a rock-shaft 74 and has a yielding tension toward the shaft 39, so that when the recess 73 reaches the upper end of the dog 72 the latter will automatically enter said recess. When the indicating cylinders or drums and indicating-disks are in their lower position, as shown in Fig. 5, the upper end of the dog 72 is held rearward by means of the inclined plate 75, which may be made integral with the metal comprising the sleeve 69, surrounding the upper part of the shaft 39. The plate 75 inclines upward and rearward from the upper end of the vertically-movable bar 66, as shown in Fig. 5, and the upper end of the dog 72 rides against the rear surfaces of the said plate 75 during the up-and-down motions of the bar 66 with the indicating cylinders or drums and indicating-disks. The exposed crank-handle 20 is, in the usual operation of the machine, pulled from its normal vertical position (shown in Fig. 4) to a horizontal position and then is moved back to its normal vertical position, and when the handle 20 is pulled downward to a horizontal position the lever-arm 70 on the driving-shaft 19 elevates the bar 66 until the dog 72 engages the recess 73 in said bar, and thereupon the exposed crank-handle 20 is returned to its upper normal vertical position and the lever-arm 70, connected with the shaft 19, turns downward from the foot 71 of the said bar 66. The bar 66 does not, however, at such time return downward with the lever-arm 70, but remains supported by the dog 72, said bar 66 remaining thus in its upper position, so as to insure the exposure of the indication through the windows 17 and 18 until in the event of a subsequent sale it becomes necessary to again have the indicating cylinders or drums and indicating-disks return to their lower position. The indicating cylinders or drums and the indicating-disks will remain in their upper exposure position until the hand setting-levers 21 are again moved in the usual operation of the machine, and at this time the movement of any one of said hand setting-levers 21 will result in the turning of the rock-shaft 74 and dog 72 rearward, freeing the latter from the recess 73 in the vertically-movable bar 66 and permitting said bar 66 and all the indicating devices to descend by gravity to the position in which they are shown in Fig. 5.

Adjacent to the side of each rack-bar 31, 32, 33, and 34 and positively connected therewith is provided a toothed vertical bar 77, and upon the rock-shaft 74 in line with the toothed bars 77 are secured the pawls 78, whose upper ends are against the toothed bars 77. The engaging ends of the pawls 78 are beveled, so as to enter the teeth of the toothed bars 77 and to be capable of being pushed rearward therefrom when said rack-bars 77 ascend. There is one toothed bar 77 secured to each of the rack-bars 31, 32, 33, and 34, and one pawl 78 is provided for each of said toothed bars 77, the pawls 78 being rigidly secured to the rock-shaft 74. The pawls 78 are given a spring tension toward the toothed bars 77 by means of a coiled spring 79, connected at one end with the left-hand pawl 78 and at the other end to the adjacent stationary frame 42. The coiled spring 79 is of light tension and keeps the pawls 78 and the dog 72 under a normal tension, drawing them toward the front of the machine. Since all of the pawls 78 and dog 72 are rigidly secured on the rock-shaft 74 and since each of the rack-bars 31, 32, 33, and 34 is equipped with one of the toothed bars 77, it is evident that upon motion being imparted to any one of the rack-bars 31, 32, 33, and 34 the toothed bar 77 connected with the rack-bar moved will press the pawl 78, engaging the same slightly rearward as the teeth of the toothed bar moves against and pushes outward the upper end of the said pawl. This outward movement imparted to any one of the pawls 78 will rock the shaft 74 and move the dog-arm 72 rearward. When the indicating cylinders or drums and indicating-disks are in their lower position, the pawl-arms 78 and rock-shaft 74 do not perform any special function, and they do not interfere with the rotation of the said indicating cylinders or drums and indicating-disks from the hand setting-levers 21. When, however, by means of the crank-handle 20, driving-shaft 19, and lever-arm 70 the bar 66 is pushed upward to elevate the indicating devices to a position in line with the window-openings 17 18, the upper engaging ends of the pawls 78, Fig. 9, will enter the teeth of the toothed bars 77 and allow the upper end of the dog 72 to enter the recess 73 in the said bar 66 and maintain said bar and the parts connected therewith in their elevated position. When the indicating devices are thus held in their upper position, it is for the purpose of exposing the indication or the amount of a sale. When, however, a further sale has been made, it will be desirable that the indicating devices descend to their lower position, so that they may be rotated while substantially concealed, and to this end the movement of any one of the hand setting-levers 21 will result in the toothed bar 77 of the rack-bar connected with the lever 21 moved pressing the pawl 78 engaging the same rearward, and thereby rocking the shaft 74 sufficiently to carry the dog 72 from the recess 73 in the bar 66, and at such time the bar 66, with the indicating devices connected therewith, being left unsupported, will descend to the lower position thereof. Thus all of the pawls 78 are operated by the movement of any one of the levers 21, and hence should the indicating devices be in their upper position and any one of the levers 21 be moved the dog 72 will be released from the recess 73 in the bar 66 and the indicating devices will descend to their lower position. When the indicating devices are in their lower position, the upper end of the dog 72 is held rearward by the inclined plate 75, secured at the upper end of the bar 66, and while this dog 72 is thus held rearward it will hold the pawls 78 clear of the teeth of the toothed bars 77, and hence during the rotation of the indicating cylinders or drums while the latter are at their lower position the toothed bars 77 will not rattle against the points of the pawls 78. In order to avoid lost motion and to render the movements of the vertical bar 66 and parts carried therewith uniform, as well as to prevent undue momentum of parts, we provide, as shown in Fig. 5, the light coiled springs 80 81, the spring 80 being connected at its lower end to the foot 71 of the bar 66 and at its upper end to the stationary guide-loop 67, while the spring 81 is connected at its lower end to the stationary guide-loop 67 and at its upper end to the front portion of the stirrup or bent bar 65, where the latter passes to the front of the upper end of the vertical bar 66. When the bar 66, with the indicating devices, moves upward, it will extend the spring 81 and allow the spring 80 to contract, and when the bar 66 descends to its lower position the spring 80 will be extended and the spring 81 allowed to contract. In order also to avoid lost motion, noise of moving parts, and to perfect and render uniform the movement of the bifurcated ends of the pivoted levers 52, 53, 54, and 55 on the rearwardly-projecting ends of the arms 58, we provide small springs 82, (shown in Fig. 1 and on an enlarged scale in Figs. 6 and 7,) one end of the spring 82 being connected with the projecting end of the arm 58 and the other end of the spring being connected with a rigid part of the bifurcated end of the lever receiving said arm 58, and said spring 82 being under a light tension in order to pull the end of the arm 58 toward a surface of the bifurcated end of its coöperating lever. In Fig. 6 we illustrate a rear view of a portion of the lever 53, while in Fig. 7 we illustrate an end view of said lever 53, with the arm 58 and spring 82 shown in their proper relation to one another and to said lever 53.

It is our purpose in the employment of the present invention to secure upon the rear ends of the shaft 61 for the indicating-disks a plate 83, as shown in Figs. 2 and 5, which plate 83 will have an elongated horizontal slot 84 in line with the center of the indicating-disks, and through which slot 84 the numerals indicating the amount of a sale will be read. The slot 84 is between and in line with the rear ends of the shafts 60 and will only expose so much of the indicating-disks as may be covered by one direct line of numerals at the adjacent central portions of said disks. The said plate 83 conceals the interior mechanism of the register and confines the attention of the observer to the special numerals exposed for indicating the amount of the sale.

In rear of the vertically-movable bar 66 and its stationary guide-bar 68 is mounted the plate 85, containing a series of vertical slots 86, Fig. 1, through which the ends of the arms 58 project from the rack-bars 31, 32, 33, and 34, the said plate 58 affording, as shown in Figs. 1 and 5, an efficient support for bolt 56, upon which the levers 52, 53, 54, and 55 are mounted, and said slots 86 affording guides for the said rearwardly-projecting arms 58.

The operation of the various parts of the mechanism hereinbefore described having been fully explained in connection with the description of said parts, it is believed that a further statement of the operation is unnecessary. The indicating-cylinders and indicating-drums have a simultaneous rotation from the hand setting-levers 21, and said drums expose their indication through the window 17, while the disks expose their indication through the window 18. One indicating-drum and one disk will be rotated concurrently with the movement of each hand setting-lever 21, so that when, for illustration, the units-of-cents hand-lever 21 is moved its movement will effect the simultaneous rotation of the units-of-cents indicating cylinder or drum 23 and the units-of-cents indicating-disk 27. Should the indicating cylinders or drums and indicating-disks be simply rotatable and not vertically movable, they should be disposed with due regard to the situation of the window-openings 17 and 18, and when said parts are arranged to be moved vertically they should when in their lower position be somewhat below said window-openings 17 and 18. When the vertically-movable bar 66 and the indicating cylinders or drums and indicating-disks are moving to their upper or exposure position, the hand setting-levers 21 and the racks 31, 32, 33, and 34 and racks 44, 45, 46, and 47 remain stationary, and hence since the pinion-wheels connected with the indicating cylinders or drums and indicating-disks are in mesh with said racks the said cylinders or drums and disks will rotate while traveling upward. The length of the upward movement of the said indicating cylinders or drums and indicating-disks is such, however, that the said devices will perform one rotation during their upward travel, and hence the said cylinders or drums and disks, when they arrive at their upper position, will expose at the window-openings 17 18 the identical numerals to which said devices were set when in their lower position by the hand-levers 21.

The levers 54 and 55 for operating the indicating-disks, while supported by the bolt 56, are, as shown in Fig. 5, immediately on the hubs of the levers 52 and 53.

What we claim as our invention, and desire to secure by Letters Patent, is—

1. In a cash-register, the rotary indicating-disks 27, 28, and 29, 30, each bearing numerals from "0" to "9" inclusive in the line of a circle along the outer portions of its face, and said disks 27, 30, being respectively smaller in diameter than and disposed within the circle of the disks 28, 29, combined with the units-of-cents and tens-of-cents hand setting-levers 21 in line with the units-of-dollars and tens-of-dollars indicating-disks 29, 30, intermediate connecting mechanism between said levers and the units-of-cents and tens-of-cents disks 27, 28, for rotating the latter from the said levers, the units-of-dollars and tens-of-dollars hand setting-levers 21 in line with the units-of-cents and tens-of-cents indicating-disks 27, 28, and intermediate connecting mechanism between said dollars-levers 21 and said disks 29, 30, for rotating the latter from the said dollars-levers; substantially as set forth.

2. In a cash-register, the rotary indicating-disks 27, 28, and 29, 30, each bearing numerals from "0" to "9" inclusive in the line of a circle along the outer portions of its face, and said disks 27, 30, being respectively smaller in diameter than and disposed within the circle of the disks 28, 29, combined with the hand setting-levers, the pinion-wheels connected with the said disks, means intermediate said hand-levers and said pinion-wheels for rotating the said wheels and their said disks from said hand-levers, the inclosing casing having the window-opening for the indication, and means for elevating said disks, after they have been rotated by said hand-levers, to said window-opening to expose the indication; substantially as set forth.

3. In a cash-register, the rotary indicating-disks 27, 28, and 29, 30, each bearing numerals from "0" to "9" inclusive in the line of a circle along the outer portions of its face, and said disks 27, 30, being respectively smaller in diameter than and disposed within the circle of the disks 28, 29, combined with the hand setting-levers, the pinion-wheels connected with the said disks, means intermediate said hand-levers and said pinion-wheels for rotating the said wheels and their said disks from said hand-levers, the inclosing casing having the window-opening for the indication, means for elevating said disks, after they have been rotated by said hand-levers, to said window-opening to expose the indication, means for supporting said disks in their thus-elevated position, and means connected with said hand-levers for withdrawing said supporting means from said disks on the movement of any one of said setting-levers so as to allow said disks to descend; substantially as set forth.

4. In a cash-register, the rotary indicating cylinders or drums 23, 24, and 25, 26, bearing upon their periphery the numerals from "0" to "9" inclusive, and the rotary indicating-disks 27, 28, and 29, 30, bearing numerals from "0" to "9" inclusive, the said disks 27, 28, being for units of cents and tens of cents and disposed in line with and at right angles to the units-of-dollars and tens-of-dollars cylinders or drums 25, 26, and the said disks 29, 30, being for units of dollars and tens of dollars and disposed in line with and at right angles to the units-of-cents and tens-of-cents cylinders or drums 23, 24, combined with the hand setting-levers 21, and means intermediate said levers and said cylinders or drums and disks, whereby the movement of said levers will rotate said cylinders or drums and said disks; substantially as set forth.

5. In a cash-register, the rotary indicating cylinders or drums 23, 24, and 25, 26, bearing upon their periphery the numerals from "0" to "9" inclusive, and the rotary indicating-disks 27, 28, and 29, 30, bearing numerals from "0" to "9" inclusive, the said disks 27, 28, being for units of cents and tens of cents and disposed in line with and at right angles to the units-of-dollars and tens-of-dollars cylinders or drums 25, 26, and the said disks 29, 30, being for units of dollars and tens of dollars and disposed in line with and at right angles to the units-of-cents and tens-of-cents cylinders or drums 23, 24, combined with the hand setting-levers 21, the pinion-wheels connected with said cylinders or drums and said disks, the rack-bars in mesh with said pinions for rotating the same and said cylinders or drums and disks, and means connecting said hand-levers with said rack-bars in pairs, whereby on the movement of any one of said hand setting-levers 21, two of said rack-bars will be moved to rotate one cylinder or drum and one disk; substantially as set forth.

6. In a cash-register, the rotary indicating cylinders or drums 23, 24, and 25, 26, bearing upon their periphery the numerals from "0" to "9" inclusive, and the rotary indicating-disks 27, 28, and 29, 30, bearing numerals from "0" to "9" inclusive, the said disks 27, 28, being for units of cents and tens of cents and disposed in line with and at right angles to the units-of-dollars and tens-of-dollars cylinders or drums 25, 26, and the said disks 29, 30, being for units of dollars and tens of dollars and disposed in line with and at right angles to the units-of-cents and tens-of-cents cylinders or drums 23, 24, combined with the hand setting-levers 21, the pinion-wheels connected with said cylinders or drums and said disks, the rack-bars in mesh with said pinion-wheels for rotating the same and said cylinders or drums and disks, the series of lever-arms 52, 53, 54 and 55 disposed at the rear portion of the machine below the said indicating devices, means respectively connecting the said hand-levers with one end of said levers 52, 53, 54 and 55, means connecting the rack-bars for said cylinders or drums with said hand-levers, and means respectively connecting the rack-bars for said indicating-disks with the other end of said levers 52, 53, 54 and 55, whereby upon the movement of any one of said hand-levers 21, two rack-bars will be moved, one for rotating one of the cylinders or drums and the other for rotating one of the said disks; substantially as set forth.

7. In a cash-register, the rotary indicating-disks 27, 28, and 29, 30, each bearing numerals from "0" to "9" inclusive in line of a circle along the outer portions of its face, and said disks 27 and 30 being smaller in diameter than and disposed within the circle of the disks 28, 29, combined with the rotary indicating cylinders or drums 23, 24 and 25, 26, each bearing numerals from "0" to "9" inclusive on its periphery, the series of hand setting-levers 21, and means intermediate said levers and said cylinders or drums and said disks, whereby on the movement of any one of said levers one of the said cylinders or drums and one of said disks will be rotated; substantially as set forth.

8. In a cash-register, the rotary indicating-disks 27, 28, and 29, 30, each bearing numerals from "0" to "9" inclusive, and the rotary indicating cylinders or drums 23, 24, and 25, 26, each bearing numerals from "0" to "9" inclusive, combined with the hand setting-levers 21 and means intermediate said levers and said cylinders or drums and disks, whereby on the movement of any one of said levers one of said cylinders or drums and one of said disks will be correspondingly rotated so as to indicate at the front and rear sides of the register simultaneously, with the numerals in position to be read from left to right; substantially as set forth.

9. In a cash-register, the casing having the front and rear window-openings, the rotary indicating-disks 27, 28, and 29, 30, each bearing numerals from "0" to "9" inclusive, the rotary cylinders or drums each bearing numerals from "0" to "9" inclusive on its periphery, and the vertically-movable frame supporting said cylinders or drums and said disks, combined with the hand setting-levers 21, means intermediate the same and said cylinders or drums and disks for rotating the latter from said hand-levers, the operating crank-handle 20, the driving-shaft 19 receiving said handle, and means intermediate said shaft and the frame supporting the indicating devices for elevating said indicating devices to said window-openings on the movement of said crank-handle; substantially as set forth.

10. In a cash-register, the casing having the front and rear window-openings, the rotary indicating-disks 27, 28, and 29, 30, each bearing numerals from "0" to "9" inclusive, the rotary cylinders or drums each bearing numerals from "0" to "9" inclusive on its periphery, and the vertically-movable frame supporting said cylinders or drums and said disks, combined with the hand setting-levers 21, means intermediate the same and said cylinders or drums and disks for rotating the latter from said hand-levers, the operating crank-handle 20, the driving-shaft 19 receiving said handle, means intermediate said shaft and the frame supporting the indicating devices for elevating said indicating devices to said window-openings on the movement of said crank-handle; the dog for supporting the said indicating devices in their elevated position, and means for releasing said supporting-dog from said indicating devices on the movement of any one of said setting-levers 21; substantially as set forth.

Signed at New York, in the county and State of New York, this 17th day of September, 1900.

HARVEY GILES.
      JOHN G. FLEMING.

Witnesses:
 CHAS. C. GILL,
 GUNDER GUNDERSON.